A. LATHAM.
MACHINE FOR MAKING NAIL STRINGS.
APPLICATION FILED OCT. 5, 1918.
1,415,936.
Patented May 16, 1922.
6 SHEETS—SHEET 1.
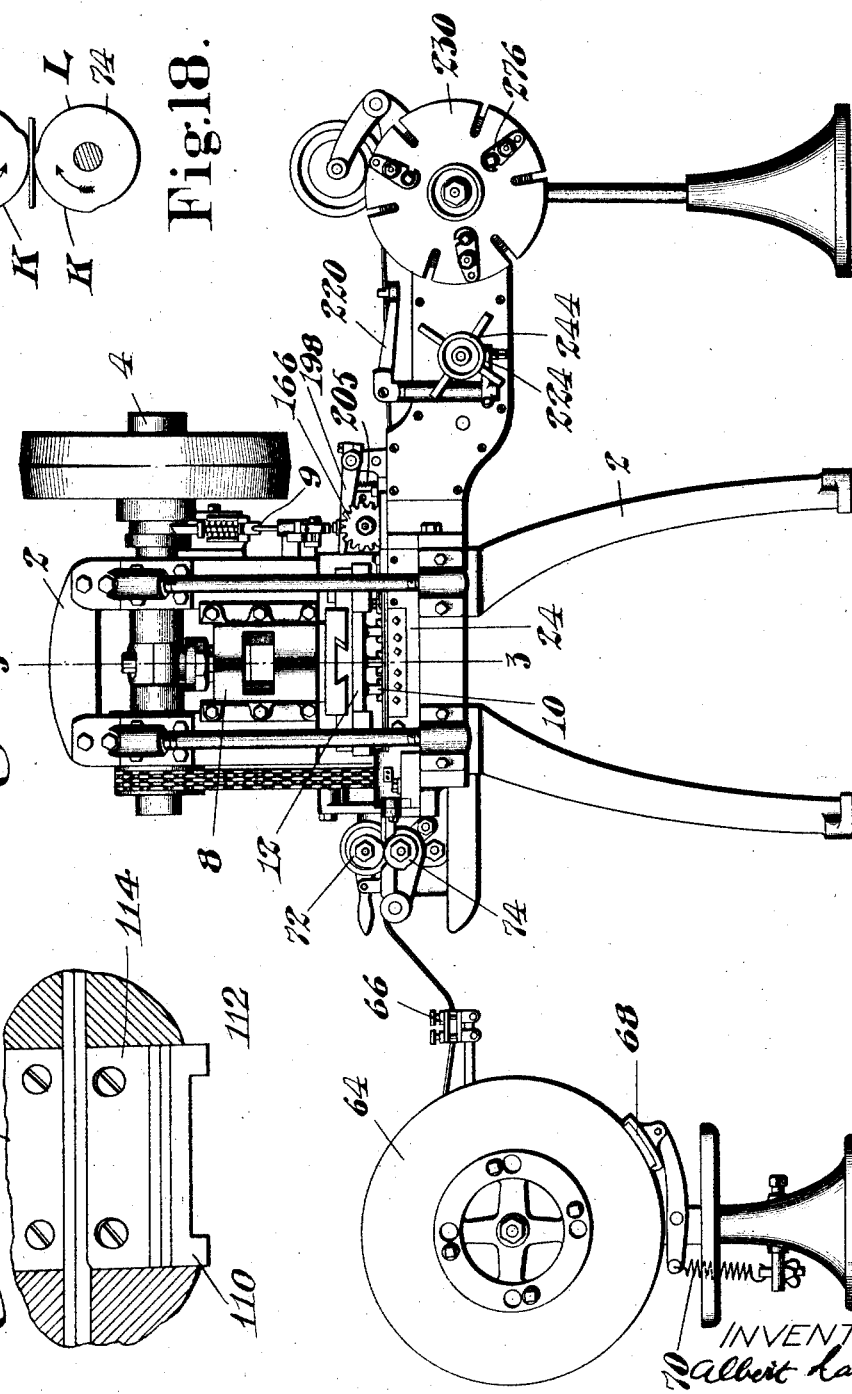

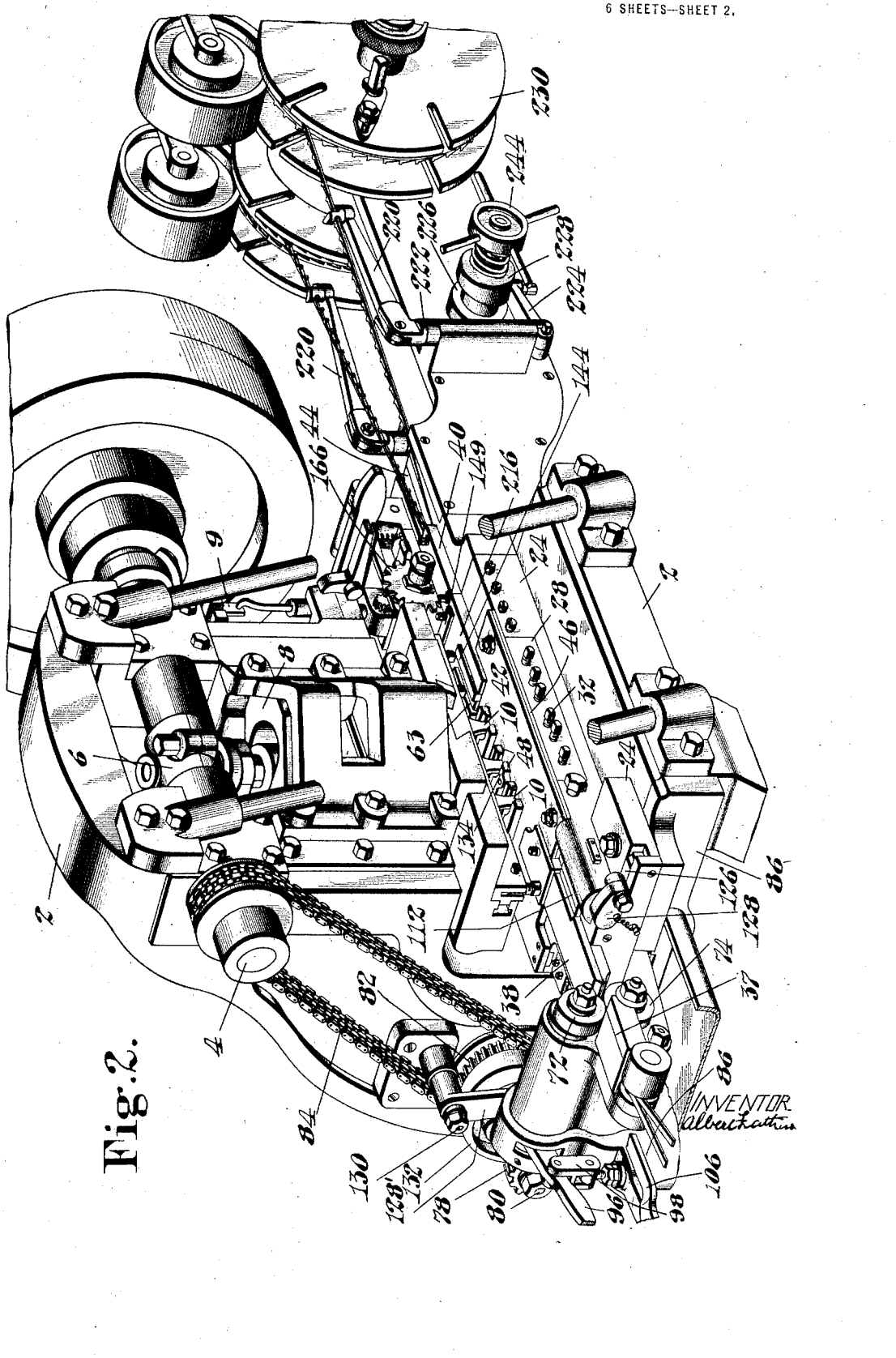

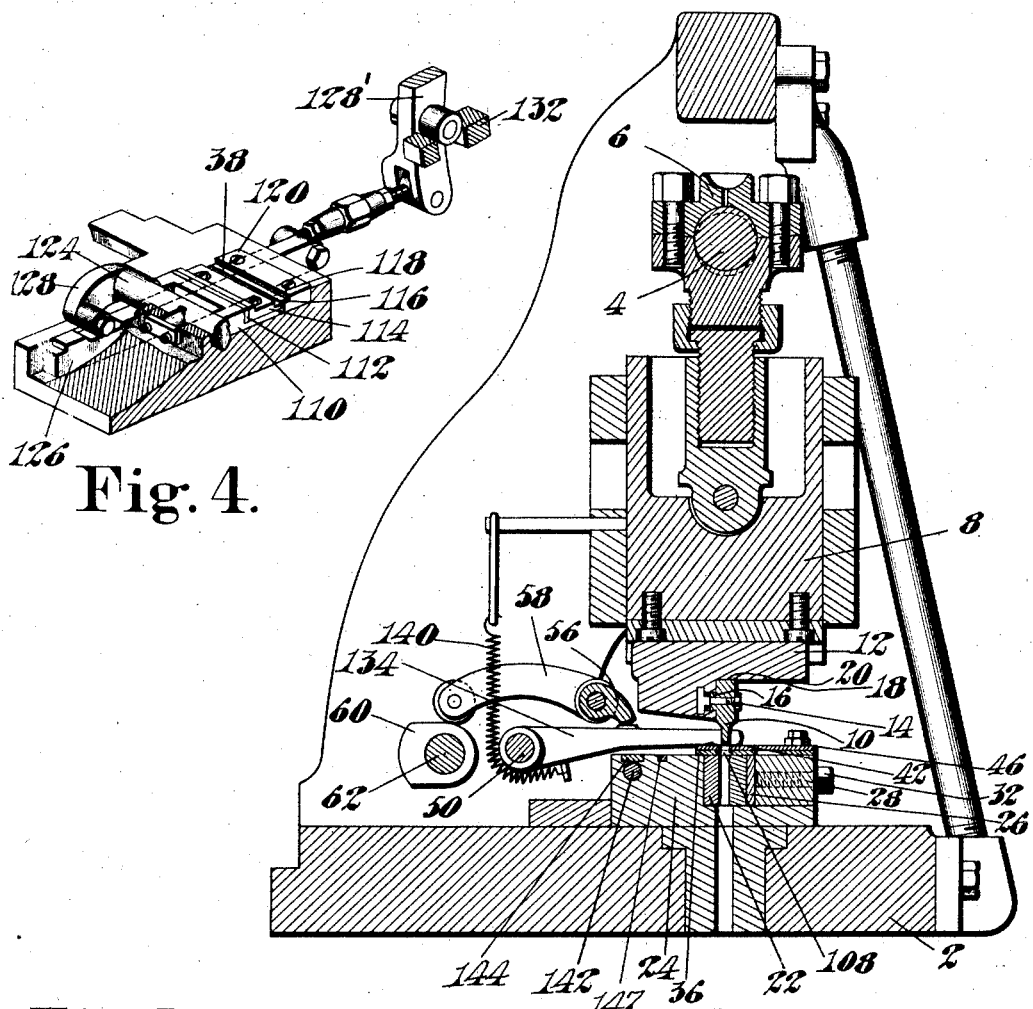
Fig. 4.
Fig. 3.
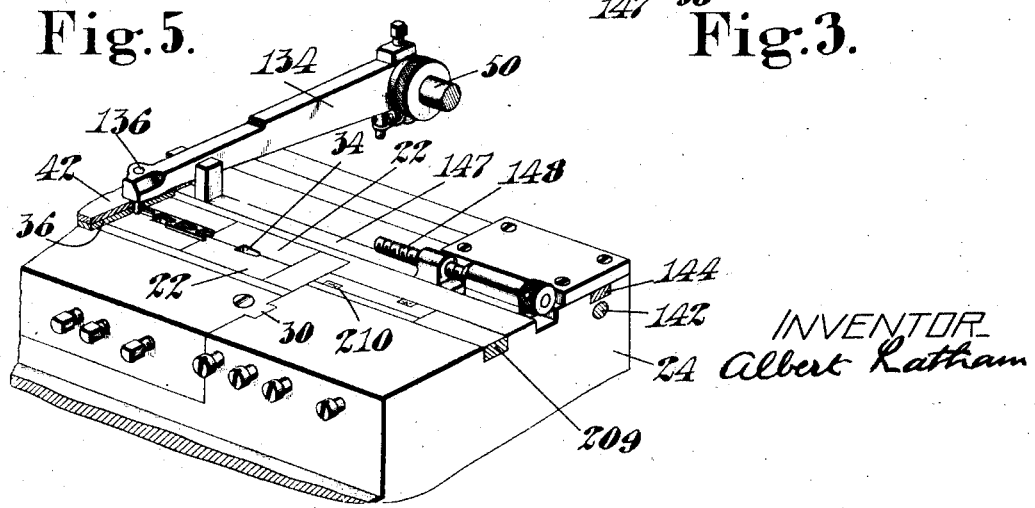
Fig. 5.
INVENTOR
Albert Latham

A. LATHAM.
MACHINE FOR MAKING NAIL STRINGS.
APPLICATION FILED OCT. 5, 1918.
1,415,936.
Patented May 16, 1922.
6 SHEETS—SHEET 4.
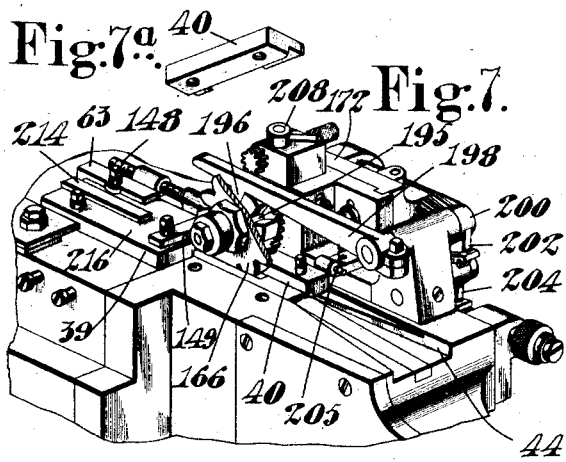
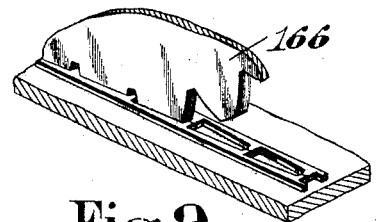
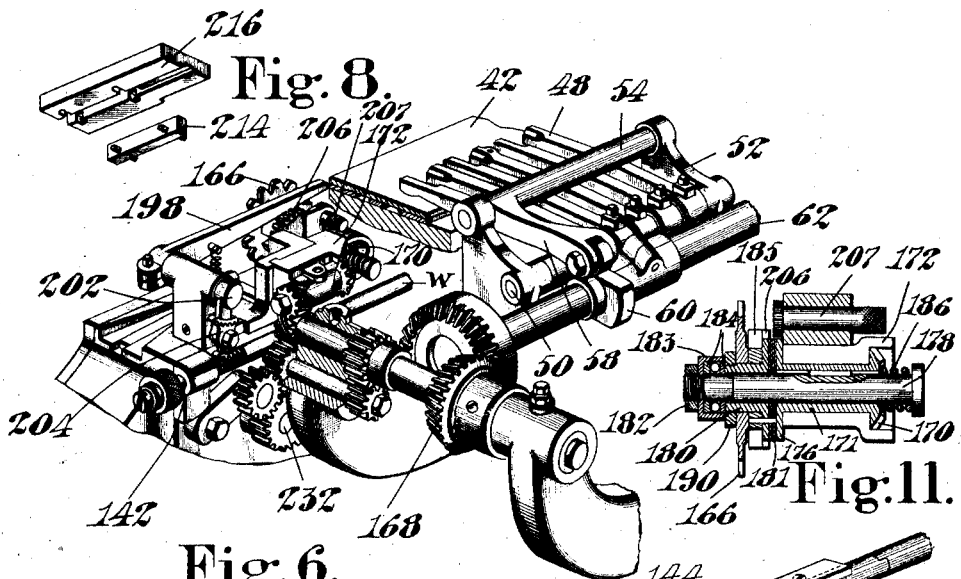
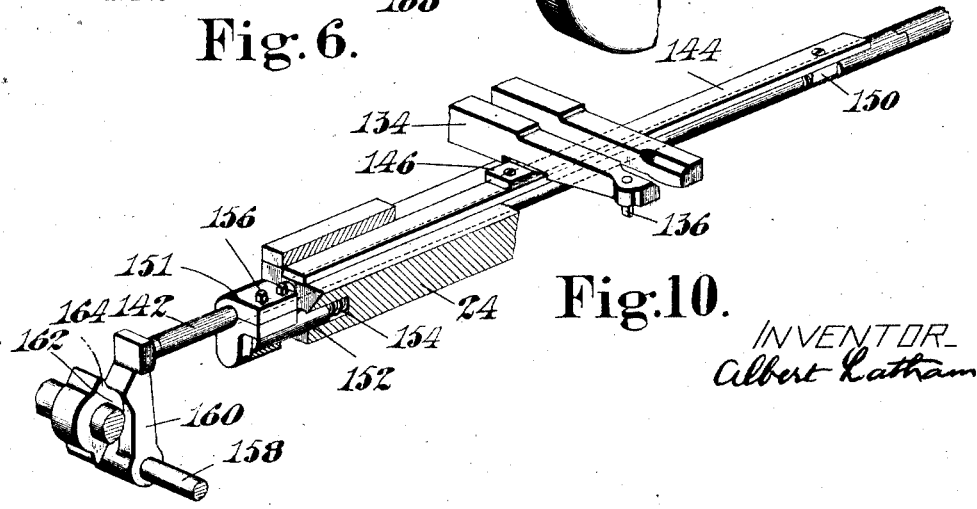
INVENTOR
Albert Latham

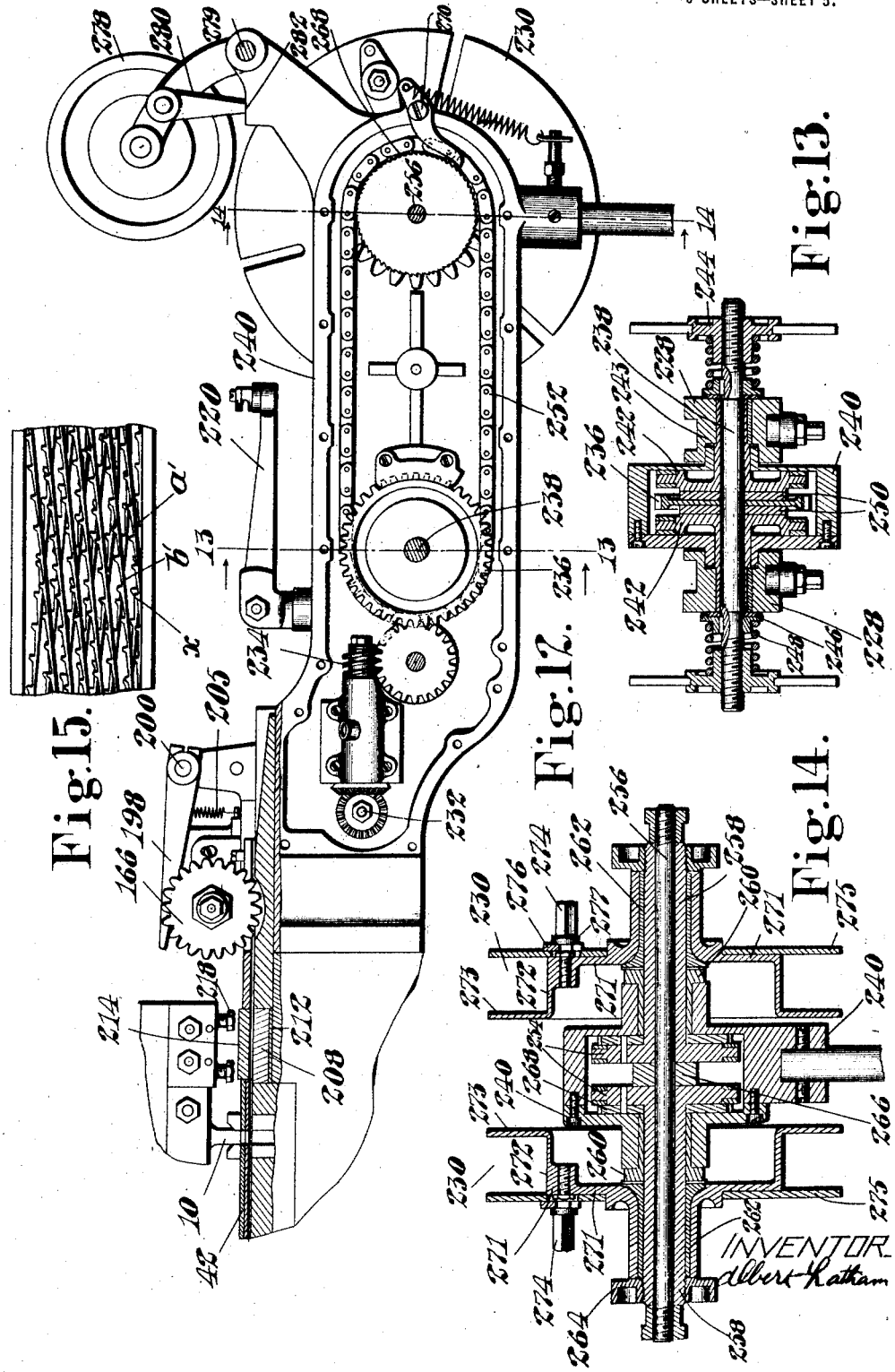
A. LATHAM.
MACHINE FOR MAKING NAIL STRINGS.
APPLICATION FILED OCT. 5, 1918.
1,415,936. Patented May 16, 1922.

A. LATHAM.
MACHINE FOR MAKING NAIL STRINGS.
APPLICATION FILED OCT. 5, 1918.
1,415,936.
Patented May 16, 1922.
6 SHEETS—SHEET 6.
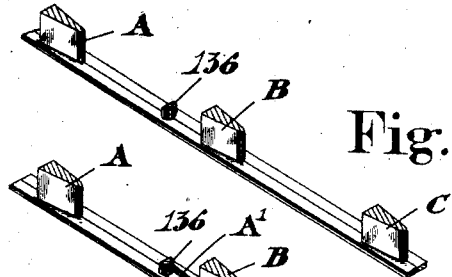
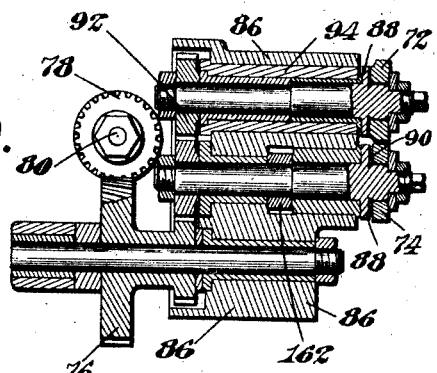
Fig.19.
Fig.16.
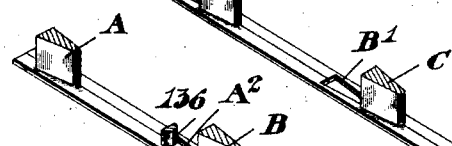
Fig.20.
Fig.21.
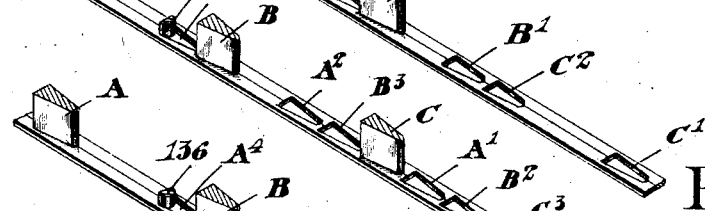
Fig.22.
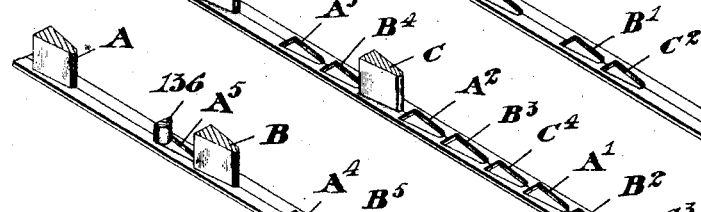
Fig.23.
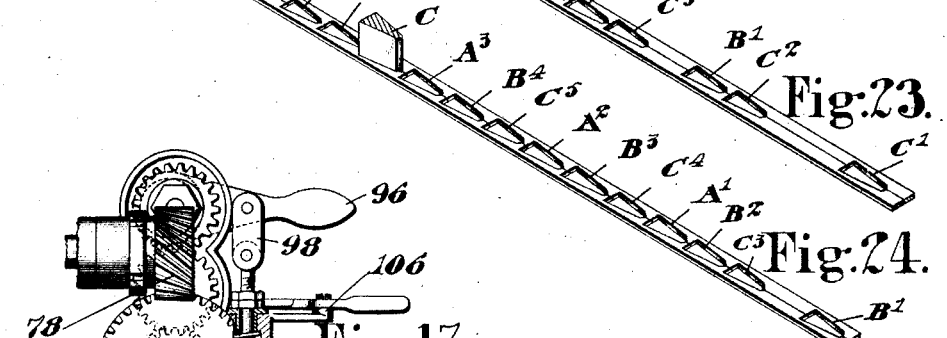
Fig.24.
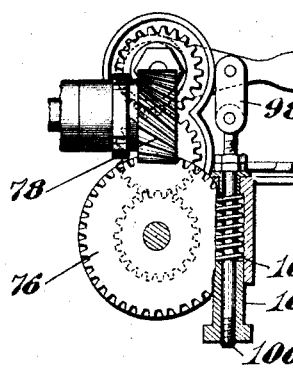
Fig.17.
INVENTOR
Albert Latham

UNITED STATES PATENT OFFICE.

ALBERT LATHAM, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR MAKING NAIL STRINGS.

1,415,936.      Specification of Letters Patent.     Patented May 16, 1922.

Application filed October 5, 1918. Serial No. 257,034.

*To all whom it may concern:*

Be it known that I, ALBERT LATHAM, a citizen of the United States, and resident of Beverly, in the county of Essex and State of Massachusetts, have invented certain Improvements in Machines for Making Nail Strings, of which the following description, in connection with the accompanying drawings, is a specification, like reference characters on the drawings indicating like parts in the several figures.

This invention relates to the making of strings of connected nails and has for its object the devising of an improved method and apparatus by which nail-strings may be produced more rapidly and economically than has heretofore been possible.

It is a common factory practice to form nail-strings from flat strips of metal of a width equal to the desired length of the heads of the nails by severing spaced portions from an edge of each strip. The parts of the strips from which such portions are severed constitute the shanks of the nails of the resultant nail strings, and the parts intermediate between the notches or recesses formed in the strips by the severance of such portions therefrom form the heads of the nails when they are detached from the nail strings. Prior to applicant's invention, the strips were operated upon separately to convert them into nail-strings. Applicant's invention, however, contemplates assembling a plurality of strips together and operating on all of them at the same time, thus greatly enhancing the rate of production of nail-strings from the strips. In accordance with an important feature of this invention, a plurality of the strips are positioned side by side with their contiguous edges in contact or substantially so, and spaced portions of the strips oppositely disposed relatively to the line of contact of the strips are then died out from the contiguous edges of the strips to form them into nail-strings. In accordance with a further feature of the invention, the spaced portions which are died out from the contiguous edges of the strips are reversely arranged on opposite sides of the line of contact of the strips and taper from relatively narrow forward ends to their wider rear ends so as to produce nail-strings having nails extending in the same direction and formed with tapered shanks disposed rearwardly of the heads of the nails. The advantage of forming the nail-strings so that the nails extend in the same direction and with their heads disposed forwardly of their shanks is that they can be wound on the reels of the machine so that the nails will come from the reels points first, thus enabling the transfer of the coil directly from the nail string making machine to the nail inserting machine without the necessity of previous rewinding of the coil.

The apparatus according to this invention comprises means providing a single guiding passage constructed to receive a plurality of strips and mechanism operative to die out portions of each strip simultaneously. Preferably, the guiding means is so formed as to guide the strips disposed side by side and with their contiguous edges in contact or substantially so and the dieing means is organized to die out spaced portions from the contiguous edges of the strips oppositely disposed relatively to the line of contact of the strips. In the present exemplification of the invention, there is provided a stationary die over which the strips are guided and which is formed with an opening having its median line registering substantially with the line of contact of the strips and of like form at each side of its median line. A movable die member corresponding in form to the opening in the stationary die severs portions from the contiguous edges of the strips thus simultaneously producing nail-strings of uniform character.

Other features of the invention reside in various parts of the organization of the machine, for example, the rolls for feeding the strips which, although continuously rotated, are so constructed as to feed the strips intermittently, and one of which is mounted for universal movement on its shaft to accommodate itself to irregularities in the strips, such as when strips of different thicknesses are being operated upon simultaneously, to the end that the grip of the feed rolls on the strips may be maintained despite such irregularities in the strips and the strips fed uniformly. The mechanism employed for feeding the strips through the machine comprising the feed rolls which advance the strips to the dies and devices for withdrawing the strips from the dies also embodies novel and improved features, as does the means herein provided for locating the strips relatively to the dies. Inasmuch as the strips sometimes vary in width, preliminary strip guiding means is provided having a guiding passage of a width greater than that of the main guide which controls the strips, while being operated on by the dies and swaging mechanism is provided at the delivery end of the preliminary guide operable on the edge of a strip to reduce the width of the strip or strips in the guide to a degree such that they will enter the passage of the main guide freely. The main guide is thereby enabled to exercise the positive control required over the strips while being operated upon by the dies. Improved reeling means is also provided to receive the strips as they are delivered from the machine.

Still other features of the invention involving various combinations of parts and details of construction will appear as the description proceeds and will be pointed out in the appended claims.

In the drawings,—

Figure 1 is a view in front elevation of a machine embodying the invention;

Fig. 2 is a view in perspective of the principal features of the machine shown on a scale enlarged over that of Fig. 1;

Fig. 3 is a view in cross-section taken through the stationary die block and the head carrying the movable die members or punches;

Fig. 4 is a view of the device for swaging the edge of one of the strips;

Fig. 5 is a view partly in cross-section showing the stationary dies and the stop finger which locates the strips being operated upon relatively to the dies;

Fig. 6 is a view in detail showing the fingers which operate the stripper plate, the feed wheel for withdrawing the nail strings from the machine, and the operating means for the plate and wheel;

Fig. 7 is a view of substantially the same parts looking from the left of Fig. 6;

Fig. 7ª is a detailed view of the plate which laterally supports the periphery of the feed wheel on its front side;

Fig. 8 shows parts of the marking mechanism;

Fig. 9 illustrates the manner of engagement of the projecting teeth of the feed wheel with the nail strings;

Fig. 10 is a view in detail of the controlling devices for the stop finger;

Fig. 11 is a view in cross-section through the center of the feed wheel;

Fig. 12 is a cross-sectional view showing the mechanism for operating the take-up reels;

Fig. 13 is a view in cross-section of the operating mechanism for the take-up reels and of the cams which control the laying of the nail-strings on the take-up reels, taken along the line 13—13 of Fig. 12 looking in the direction of the arrows;

Fig. 14 is a view in cross-section through the axis of the take-up reels taken along the line 14—14 of Fig. 12;

Fig. 15 is a broken view of a portion of one of the take-up reels showing the manner in which the nail-string is coiled thereon;

Fig. 16 is a view in cross-section through the strip feeding rolls and the operating shaft therefor;

Fig. 17 is a view of like parts looking from the left of Fig. 16;

Fig. 18 shows the contour formation of the feeding rolls,

Figs. 19 to 24 inclusive illustrate the manner of operation of the dies in forming the strips into nail-strings, and Fig. 25 is a view in plan of the nail string guiding passage.

The machine comprises a frame 2 having mounted therein a shaft 4 controlled in its rotation by a clutch 9 of suitable construction and provided with an eccentric which is received within a strap 6 by which the head 8 carrying the movable die members or punches 10 is operated. The head 8 carries a block 12 to which are secured the die members 10 in any desired manner. Preferably and as shown, a downwardly protruded portion of the block 12 is provided with a T-shaped slot extending substantially from end to end of the block and opening on the front vertical surface of the projecting portion of the block so as to receive therein the T-shaped heads of the bolts 14 which pass through openings in the die members 10 and secure them to the punch block 12 with the bosses 16 of the die members fitted in openings in the punch block corresponding in shape and size to the bosses 16. The punch block 12 and the die members 10 are so constructed that the rear surfaces 18 of the die members seat against the lower surface 20 of the punch block when the die members have their bosses 16 inserted in the openings of the block. The die members 10 are thus secured to the punch block with great rigidity and strength since the backward pressure of such members when forced against the work is resisted not only by the engagement of the bosses 16 of the die members with the walls of the openings of the block, but also by the engagement of the surfaces 18 of the die members with the surface 20 of the punch block.

The strips to be operated upon are guided over a stationary die which, in the illustrated construction, is composed of die members 22 carried in a die block 24 mounted on the frame 2 of the machine, the block 24 being recessed in its upper right hand corner (see Fig. 3) to receive the die members 22 and a plate 26 which extends from end to end of the die members. A block 28 is dovetailed, as indicated at 30 (see Fig. 5), into the recess of the main die block outside of the plate 26, and threaded into the block 28 are screws 32 which engage the side of the plate 26 and press said plate against the stationary die members 22 to secure them firmly in the recess of the die block 24. Preferably and as illustrated, three movable die members or punches 10 are provided and corresponding with such members are three sets of stationary die members, each set being formed of two like sections as indicated in Fig. 5. The die members 22 are formed with opposed recesses providing openings 34 to receive the movable die members 10, which when forced into such openings remove from the strip or strips interposed between the movable and stationary die members portions corresponding in size and shape to the die members.

In accordance with the method of this invention, nail strings are formed from metal strips by disposing the strips side by side with their inner or contiguous edges in contact or substantially so and then dieing out spaced portions from the inner edge of each strip in such a manner as to form recesses in the inner or contiguous edges of the strips oppositely disposed relatively to the line of contact of the strips. The nails of the strings are preferably formed with tapered shanks, and to such end the portions severed from the strips are correspondingly tapered from one end to the other to impart such shape to the recesses. The recesses are reversely arranged on opposite sides of the line of contact of the strips by reason of which the nails are similarly disposed in the nail strings as will be clear by reference to Fig. 24 showing strips in which the wider and narrower portions of the recesses are respectively opposite each other with the narrower portions of the recesses at the right as seen in the figure so that the heads of the nails of each string are disposed to the right of the nail shanks.

To adapt the machine of this invention to the carrying out of such method, there is incorporated therein guiding means formed to provide a single guiding passage constructed to conduct a plurality of strips, preferably two, between the stationary dies 22 and the movable dies 10 with their inner edges in contact or substantially so. The strips are positioned so that the line of contact thereof registers with the median lines of the die members 10 and openings 34 of the die members 22. To the end that the nail strings may be formed as hereinbefore set forth with tapered nails similarly disposed in the nail string, the recesses of the die members 22 are reversely arranged on opposite sides of the median line of the openings 34.

The guiding means by which the strips are located relatively to the die members comprises a guide 36 carried by a flexible stripper plate 42 which overlies the stationary die members 22 and to which the strips are conducted through guides 37 and 38 (see Fig. 2). The strips, as they pass between the dies, are operated upon by them and thus formed into nail strings which are discharged from the machine through the flared recess 44 which constitutes the delivery end of the guiding passage provided by guides 37, 38, 36, and guide plates 39 and 40.

In order to insure the efficient operation of the die members on the strips as they pass through the guides, means is provided for maintaining the strips immovably against the stationary dies 22 during the operation of the movable dies thereon. As illustrated, such means comprises the flexible stripper plate 42, hereinbefore mentioned, the said plate being secured at its front edge to the die block 24 by any suitable means such as bolts which pass through the edge of the strip and through a bar 46 which is formed of slightly greater thickness at its inner than at its outer edge, so as to maintain the free edge of the stripper plate 42 and the attached guide plate 36 normally at a slight distance from the upper surfaces of the strips to permit free advance of the strips. A plurality of fingers 48 (see Fig. 6) are disposed with their ends overlying the free edge of the stripper plate 42, said fingers being fulcrumed eccentrically on a rod 50 carried by brackets 52 mounted on the machine frame, the brackets 52 also providing bearings for a shaft 54 which carries a lateral projection 56 (see Fig. 3) extending transversely of the fingers 48 and operable to press the fingers against the stripper plate 42 thereby to force the stripper plate downwardly as enabled by the flexibility of the plate to clamp the strips against the stationary dies. As shown, the shaft 54 is connected to an arm 58 operated by a cam 60 on a shaft 62. The cam 60 forces the fingers 48 intermittently against the stripper plate in such time relation as to clamp the strips between the stripper plate 42 and the stationary dies while they are being operated upon by the dies. The free edge of the stripper plate is prevented from rising to an excessive degree when the die members 10 are withdrawn therefrom by a bar 63 (see Fig. 2) carried by the die block 24 and having a downturned end which engages the plate.

The strips which are to be formed into nail-strings are fed into the machine from a let-off reel 64 and pass in their movement from said reel through the end of a weighted lever 66 which imparts a constant tension to the strips. The rotation of the reel 64 is retarded by a brake 68 acting on the peripheral edge of the reel and controlled by a spring 70. The strips then pass into the passage of the guide 37 which conducts them between feed rolls 72 and 74 by which they are advanced into the machine. The feed rolls 72 and 74 (see Fig. 16) are operated by a worm gear 76 driven by a gear 78 on a shaft 80 which also carries a gear 82 connected by a sprocket chain 84 to the main shaft 4 of the machine. The shafts of the feed rolls are journaled in a bracket 86 carried by the frame 2 of the machine and the rolls 72 and 74 are mounted on enlarged rounded portions adjacent to the ends of the shafts outside of flanges 88 formed thereon and are maintained in place on the shafts by any suitable means, such, for example, as the washers and nuts illustrated (see Fig. 16). The upper roll 72 is clamped rigidly between the flange 88 of the shaft and the washer and nut at its end, but the lower roll 74 is spaced from its corresponding flange 88 by a felt washer 90 normally operating to maintain the roll in a vertical plane at right angles to the shaft but permitting movement of the roll on the rounded portion of the shaft when abnormal stresses are imposed thereon. This manner of mounting the roll 74 on its shaft allows the roll to accommodate itself to irregularities in the strips, such as when the strips differ in thickness. In such a case one part of the roll will be forced laterally against the felt washer 90, thus causing the roll to tip with its axis at an angle to the roll shaft so that the periphery of the roll will closely engage the thinner as well as the thicker strip in consequence of which the strips will be fed equally. As illustrated, the feed rolls 72 and 74 are driven from the gear 76 by gearing generally designated 92 (see Fig. 16).

In order to facilitate the introduction of the strips between the rolls 72 and 74, one of said rolls is preferably mounted for movement away from the other. As illustrated, the shaft of the upper roll 72 is received within an eccentric 94 to which is connected a lever 96 which, as shown, has depending therefrom a link 98 connected to a bolt 100 which has threaded thereon a nut 102 between which and the bracket 86, in which the feed rolls are mounted, is interposed a spring 104 which tends normally to turn the eccentric 94 downwardly to press the upper roll 72 against the strips on the lower roll 74. To maintain the upper roll in position after it has been raised by manipulation of the lever 96 upwardly, I provide a member 106 mounted for turning movement on the bracket 86 so as to underlie stop members, such as nuts or the like on the bolt 100.

The rolls 72 and 74 are designed to advance the strips intermittently intermediate of the operation of the dies thereon, and to such end they are formed with raised portions K and depressed portions L and their shafts so disposed that their raised portions K, when moved into the line joining the axes of the rolls, are spaced from each other by a distance less than the thickness of the strips being operated upon so as to grip the strips and advance them to the dies. When, however, the depressed portions L of the rolls are in register, or when a raised portion K of one of the rolls registers with the depressed portion L of the other roll, the strips are not gripped by the rolls and consequently rotation of the rolls does not feed the strips. It follows, therefore, that with the construction just described (see Fig. 18), the feed of the strips is intermittently effected although the feed rolls are constantly rotated from the shaft 4. The amplitude of the feeding movements of the strips may be varied by adjustment of one of the rolls angularly of its shaft. To this end the upper roll 72 is adapted to be turned about its shaft and means such, for example as coacting teeth on the roll 72 and flange 88 are provided to secure the roll in any desired angular relation thereto. The effect of the angular adjustment of the feed roll 72 on the extent of feed of the strip may be understood by reference to Fig. 18, from which it will be seen that if the roll 72 is set forward in the direction of the arrow, the feed of the strips will be decreased, since in the rotation of the rolls, the depressed portion L of the roll 72 will be sooner reached. If, on the other hand, the roll 72 is set back in the direction opposite to that indicated by the arrow, the feed of the strips will be augmented, inasmuch as greater rotation of the roll is required to bring its depressed portion L to the line joining the axes of the rolls.

The strips being operated upon vary somewhat in width, by reason of which if the strip passage 108 of the strip guide 36, Fig. 3, was made wide enough to receive the widest strips which might be introduced into the machine, it would not control the narrower strips with sufficient positiveness since there would be excessive play between the edges of the strips and the walls of the strip passage. The invention contemplates the formation of the passage 108 of a width such as efficaciously to control the narrowest strips which might be introduced into the machine. The guides 37 and 38, however, are wider than the passage 108 so as to permit the free movement therethrough of strips of abnormally great width or of those having excessively wide portions. To enable such strips to be moved without impediment through the passage 108 of the guide 36, I provide, at the delivery end of the guide 38, a swaging device operable on the edge of one of the strips to reduce the combined width of the strips. As illustrated (see Fig. 4), such device comprises a plate 110 recessed slidably in the upper side of the die block 24 and in turn provided with a recess to receive a shim 112 and a plate 114, which latter is shouldered at 116 oppositely to the shoulder 118 of a plate 120 also recessed into the block 24. The strips are passed over the shoulders 116 and 118 of the plates 114 and 120 respectively. The plate 110 is moved to a predetermined fixed distance from the plate 120 by a cam member 124 having a bearing in the block 24, and is moved away from the plate 120 by the strips, as for example, when the combined width of the strips is greater than the normal distance between the edges of the plates 114 and 120. The cam member 124 is actuated by a cam bar 126 operating on an arm 128 connected to the cam member, such bar 126 deriving its movement in turn from a lever 128′ fulcrumed on a stud 130 carried by the machine frame and driven by a path cam 132 connected to the gear 82 through which the feed rolls 72 and 74 are operated. From the foregoing, it will be understood that the cam member 124 is actuated intermittently in a direction to move the plate 110 forwardly and that if the plate is at any time moved backwardly toward the cam member 124 by reason of the combined width of the strips being excessive, the cam member will again move it forwardly to swage the strips to the proper width. The opposed shoulders 116 and 118 are made of a length greater than the feed of the strips so that all portions of the strips in passing through the guide will be operated upon, if necessary, to reduce their combined width to the proper point prior to the entrance of the strips into the guiding passage 108. The combined width to which the strips are swaged may be varied by adjusting the plate 114 on the plate 110 by the interposition of shims 112 of different thicknesses between said plates.

In order to form the nail strings perfectly, that is, in such wise that the nails of each string shall have their shanks and heads of the same shape and size, it is essential that the strips be located with exactness relatively to the die members. To this end, I provide a locating member in the form of a finger 134 having seated in its end a stop pin 136 which (see Fig. 5) is adapted to enter the passages or recesses formed in the strips by the dies. The stop finger 134 is mounted on the shaft 50 and is normally urged downwardly to engage the stop pin 136 with the strips by a spring 140 connected to the finger 134 and to the frame of the machine. The withdrawal of the pin 136 from engagement with the strips to permit them to be advanced is effected by means including a rod 142 slidably mounted in the die block 24 and operatively connected with a bar 144 carrying a wedge piece 146 which, upon endwise movement of the rod 142, passes beneath the stop finger 134 and elevates the pin 136 out of the path of movement of the strips. It is sometimes desirable, for example, in order to adapt the machine to make nail strings composed of nails of a size different from that of the nails of the strings previously turned out by the machine, to adjust the position of the stop pin 136 in the direction of the feed of the strip. In the illustrated construction, such adjustment is effected by a bar 147 having upstanding lugs embracing the end of the finger 134. The bar may be moved by rotation of a member 148 threaded into a boss on the bar, said member being provided with a knurled head engaged frictionally by the end of a bar 149 (see Figs. 2 and 7) to maintain the threaded member in any position to which it may be moved and thus prevent accidental displacement of the stop pin from adjusted position. The lateral adjustment of the stop pin 136 necessitates a corresponding adjustment of the wedge piece 146, and accordingly the bar 144 upon which the wedge piece 146 is mounted, is connected to the rod 142 in such a manner that it may be adjusted endwise of said rod. As shown, such connection comprises a threaded section on the rod 142 engaging teeth on a segment block 150 carried by the bar 144. Rotation of the rod 142 will therefore move the bar 144 and consequently the wedge piece 146 relatively to the rod. Mounted on the rod is a collar 151 in which is seated a plunger 152 between which and the bottom of a seat in the die block 24 is compressed a spring 154 which normally urges the rod in a direction to move the wedge piece 146 from beneath the stop finger 134 to permit the stop pin 136 to engage the strips. The collar 151 is secured to the rod 142 by suitable means, as by screws 156 passing through split sections of the collar, in such a manner that the connection between the collar and the rod may be loosened to permit rotation of the rod in the collar to effect the adjustment of the wedge piece 146 hereinbefore described.

Means are provided for moving the rod 142 in a direction to elevate the stop pin 136 from engagement with the strips. As illustrated, such means comprises a rod 158 journaled in the bracket 86 and carrying an arm 160 engaging the end of the rod 142 and operated by a cam 162 mounted on the shaft of the lower feed roll 74 (see Fig. 16) and formed with two outwardly projecting toes 164. The timing of the operation of the cam is such as to elevate the stop pin from engagement with the strips in synchronized relation with the operation of the stationary and movable die members and the feeding of the strips.

The strips after having been operated upon by the die members and by them formed into nail strings are withdrawn from the machine by a feed wheel 166 having projecting teeth which, in the illustrative construction, engage with a working clearance in the recesses of the nail strings to control in a positive manner the feeding of the strings (see Fig. 9). Rotation of the wheel is effected by gearing designated generally by 168 (see Fig. 6) which transmits the movement of the shaft 62 to a bevel gear 170 operatively connected to the feed wheel. The bevel gear 170 is at one end of a sleeve 171 journaled in a bracket 172 and provided at its other end with a flange 176. Slidably mounted within the sleeve and splined thereto for rotation therewith is a shaft or rod 178 upon one end of which is loosely mounted a sleeved member 180 having a flange arranged opposite to the flange 176 of the sleeve 171 between which and the flange 176 is disposed a fiber friction disk 181. The member 180 is secured to the rod 178 by suitable means such, for example, as the nut 182, washer 183, and plates 184 separated by anti-friction devices (see Fig. 11). The feed wheel 166 is loosely journaled on the sleeve 180 and interposed between the flange of the sleeve 180 and the wheel is a disk 185 which, as well as the friction disk 181 hereinbefore mentioned, is pinned or otherwise fixedly connected to the sleeve 180. The wheel 166 is maintained in normally fixed relation with the disk 185 and sleeve 180 by a nut or the like 190. To the end that rotation of the sleeve 171 may effect rotation of the sleeve 180 and the feed wheel 166 and other devices mounted on the sleeve 180, a compression spring 186 is interposed between the head of the rod 178 and the beveled gear 170 and tends normally to move the flange of the sleeve 180 and the friction disk 181 against the flange 176 of the sleeve 171. Accordingly, the wheel 166 will normally be rotated by the rotation of the gear 170, but during the suspension of the feeding movement of the strips while they are being operated upon by the dies, the movement of the wheel will also be suspended and continued rotation of the sleeve 171 will cause movement of the flange 176 relatively to the friction disk 181.

The disk 185 which during the operation of the machine rotates with the feed wheel 166 is formed with peripheral recesses 195 adapted to receive a toe or the like 196 depending from an arm 198. The arm 198 is carried by a stud shaft 200 to which is connected a segment gear 202 meshing with teeth on a pivoted lever 204 which has a toothed connection with the rod 142. The spring 154, hereinbefore mentioned, will therefore tend to move the arm 198 downwardly and movement of the stop pin 136 into the passages of the strips will thus be controlled through the rod 142 by the arm 198 and disk 185, the arrangement being such that when the toe 196 of the arm 198 rides on the periphery of a raised portion of the disk 185 intermediate between recesses 195, the rod 142 will be positioned with the wedge 146 beneath the finger 134 thus preventing engagement of the stop pin 136 with the strips. The raised portions of the disk 185 thereby prevent the stop pin 136 from pressing on the strips during their feeding movement under the force of the spring 140 and the recesses 195 permit the stop pin to move downwardly when the appropriate passage of the strip has been advanced far enough to receive it.

The toe 196 of the arm 198 is formed on its outer side (see Fig. 7) with an inclined surface which is adapted to co-act with the inclined surfaces at the left of the recesses 195, as seen in said figure. The arm 198 is normally urged downwardly by a spring 205 connected to the arm as well as by spring 154 acting through the rod 142, and its inclined surface, when the toe 196 enters one of the recesses 195, operates against the inclined surface of the recess and tends to move the feed wheel forwardly in the direction of the movement of the wheel in feeding the strips. The feed wheel 166 continues to rotate except as its rotation is checked either by engagement of the toe 196 in a recess of the disk 185 or by the movement of the strips being suspended by engagement with the stop pin 136. In either case, the tension of the strips might draw the wheel backward were it not for the pressure of the inclined face of the toe 196 on the inclined surface of a recess 195 of the disk 185. Preferably, the construction and arrangement of the toe 196 and the recesses of the disk 185 are such that the rotation of the wheel 166 is checked by the pull of the strips thereon prior to the engagement of the surface of a recess 195 of the disk 185 with the right hand surface of the toe 196, as seen in Fig. 7. If, however, the rotation of the wheel 166 is not checked prior to the engagement of such surfaces, such engagement will prevent excessive movement of the feed wheel.

By loosening the nut 190, the feed wheel may be adjusted angularly of the sleeve 180 when necessary to cause the teeth of the wheel to engage properly in the passages of the strips. To the end that the adjustment of the feed wheel may be effected without changing the disposition of the sleeve 180 or disk 185 on the shaft 178, which would displace the recesses 195 of the disk 185 relatively to the toe 196 of the arm 198, the periphery of the flange of the sleeve 180 is formed with teeth 206, and a stud 207 journaled in the bracket 172 is provided at its outer end with a pinion or the like adapted to mesh with the teeth of the sleeve 180. Suitable means, which may be operated by the cam 208 (see Fig. 7) is provided for securing the stud 207 against rotation or endwise movement in the bracket 172. When the stud 207 is moved endwise from the position shown in Fig. 11 to engage the pinion on the end of the stud with the teeth of the sleeve 180 and the stud secured in position, the sleeve 180, disk 185, and the gearing frictionally connected therewith, are all maintained in fixed position thus enabling the wheel 166 to be accurately adjusted relatively thereto.

The nail strings before their delivery from the machine are preferably marked by the imprint of certain characters thereon by which the strings made on the machine may be identified by the manufacturer. As illustrated, the marking means comprises a plate or bar 209 lying in a recess formed in the die block 24 (see Fig. 5), said plate 209 being recessed on each side to receive the marking blocks 210 which are so arranged relatively to the path of movement of the strings as to mark the nails of the nail strings at points adjacent to their heads. It will be understood that, inasmuch as the strips are formed into nail strings in the manner described, there will be forwardly of the dies two nail strings arranged oppositely to each other, that is, with their heads extending inwardly from the strings. The characters are accordingly arranged in reversed relations at opposite sides of the plate 209 so that the relation of the imprint to the nails of one string will be the same as the relation of the imprint to the nails of the other string. The depth of the imprint may be regulated by employing shims 212 (see Fig. 12) of varying thicknesses beneath the marking plate 209 and blocks 210. A block 214 having pins extending laterally therefrom and movable in slots in a plate 216 (see Fig. 7) overlies the path of movement of the nail strings and the block 214 and consequently the nail strings are forced down upon the marking plate by members 218, such as screw bolts or the like, extending downwardly from the head 8 which carries the punches or movable die members.

The nail strings, after their discharge from the flared delivery end 44 of the guiding passage pass through eyes in the ends of arms 220 jointed to upright rods 222 which are operated by arms 224 provided with rolls engaging the peripheral cam paths 226 formed in the cam members 228 at each side of the machine. The arms 220 guide the nail strings as they are coiled on the take-up reels 230. The free ends of the arms 220 at their points of nearest approach to each other are spaced by a distance greater than the width of the guiding passage for the strips. The strips therefore diverge before passing through the arms 220, and such divergence tends to maintain the strips in the guiding passage of the machine against the side walls of said passage. Consequently, even when the aggregate width of the strips is less than the width of the passage, the nail strings formed from such strips are of uniform character inasmuch as the recesses formed in the edges of the strips are of the same size. The cams 228 and take-up reels 230 are operated from a shaft 232 (see Fig. 6) driven from the gearing 168. Said shaft 232 (see Fig. 12) is in turn connected by gearing designated generally by 234 to a gear wheel 236 mounted on a shaft 238 journaled in the bracket 240 extended forwardly from the frame 2 of the machine. Loosely mounted on the shaft 238 at each side of the gear wheel 236 are sprocket wheels 242 which are formed with sleeve portions extending laterally therefrom and having bearings in the side walls of the bracket 240. The cam members 228 are slidably mounted on the sleeves of the sprocket wheels 242 and are fixed in proper position on said sleeves by stops 243 formed by shoulders on the sleeves. The shaft 238 is threaded at its ends and has screwed thereon the handled nuts 244 between which and flanged members 246 mounted for sliding movement on said shaft are interposed springs 248. The springs 248 normally tend to move the sprocket wheels 242 against the fiber washers 250 interposed between the sprocket wheels and the gear wheel 236. By this means the sprocket wheels 242 are frictionally driven, and inasmuch as the reels 230 derive their motion from the sprocket wheels through the instrumentality of the sprocket chains 252, the rotation of either of the reels will be checked or suspended whenever the tension of the nail string being coiled thereon becomes great enough to overcome the resistance between the respective sprocket wheel 242 and disk 250. The cams 228 are splined on the sleeved portions of the sprocket wheels 242, from which it results that any checking of the movement of the take-up rolls 230 will cause the movement of the corresponding cam 228 to be varied in like manner to that of the reel so that the arrangement of the nail strings on the reel will be unchanged despite variations in the speed of rotation of the reel. The reels 230 are preferably positively driven by the sprocket chains 252 which pass over sprocket wheels 254 carried by a shaft 256 mounted in the bracket 240. The sprocket wheels 254 are formed with laterally extended sleeves 258 which have splined thereto sleeves 260 journaled for rotation in bearings of the bracket 240. Mounted on the sleeves 258 are sleeves 262 provided on their inner sides with teeth or the like adapted to mesh with teeth on the outer sides of the sleeves 260. The reels 230 are mounted on the sleeves 262 and are held in place thereon by a threaded member 264. Either of the reels 230 may be angularly adjusted relatively to the sleeves 258 of the sprocket wheels 254 by loosening the threaded member 264 on the sleeve 258 and rotating the sleeve 262 on the sleeve 258 to change the relative engagement of the teeth on the sleeve 262 with those on the sleeve 260. The sprocket wheels 254 are separated from each other by a washer 266 interposed between the sprocket wheels. Pinned to each of said wheels between the wheel and the adjacent inner surface of the bracket 240 are ratchet wheels 268, co-acting with the pawls 270 (see Fig. 12) to prevent retrograde movement of the reels.

Each of the reels 230 comprises a reel member 271 having a sleeved hub portion adapted to fit over the sleeve 262. The reel member is extended first outwardly from one end of its hub portion as at 271, then laterally at 272, and then again outwardly at 273. The body of the reel is thickened at points adjacent to the junction of the portions 271 and 272 to receive bolts or the like 274 extending outwardly from said reel member. A disk 275 formed with openings which receive the bolts 274 is provided adjacent to said openings with pivoted catch pieces 276 adapted to be moved between collars 277 on the bolts 274 and the surface of said disk. The disk 275 may therefore be easily attached to or removed from the reel member 271 to maintain a coil on the reel or to permit the removal of a coil therefrom.

The nail-strings as they are coiled on the reels are pressed into close engagement with each other by rolls 278 carried by arms fulcrumed at 279 to the bracket 240. It is sometimes desirable as, for example, in order to facilitate the removal of a reel that the rolls 278 be lifted from engagement with the coil on the reel. To this end the arms carrying the rolls are provided with pawls or the like 280 adapted to rest upon shoulders 282 whereby the rolls when raised above the reels may be maintained in raised position.

The sprocket wheels 242 are preferably provided with teeth differing in number from those on the sprocket wheels 254. In the present exemplification of the invention, the wheels 242 each have 23 teeth whereas the wheels 254 have 24 teeth. Consequently the reels rotate at a rate of speed slightly less than the speed of rotation of the cam members 228, thus causing the individual rings of the nail string coil to approach the inner surface of the reel at points spaced from each other. Referring to Fig. 15 of the drawings it will be noted that the ring $a'$ contacts with the surface of the reel at X, whereas the ring $b'$ contacts with the side of the reel at a point spaced to the left of the point X by a distance such as to cause the adjacent parallel rings of the nail string to lie close together but not superposed on each other.

In the illustrated examplification of the invention, I have chosen to utilize a gang of three die members although a greater or less number may be employed without departing from the principles of the invention. In case three die members are used, adjacent portions of the die member are separated from each other by a distance equal to the aggregate length of three nails of the nail string, corresponding parts of the die members being separated by a distance equal to the length of four nails. The strip feeding means is constructed to advance the strips between consecutive operations of the die members by a distance equal to the length of three nails. Consequently, each successive operation of the die members 10 forms passages in the strips on the same side of the passages created by the last preceding operation of the dies as will appear from inspection of Figs. 19 to 24 of the drawings in which the passages formed by the die members A, B, and C in their first operation are indicated by reference letters $A^1$, $B^1$, and $C^1$. The strips are then fed a distance equal to the aggregate length of three nails of the string which places portions of the strips at the right of passages $A^1$ and $B^1$ beneath the die members B and C. Accordingly, the ensuing operation of the die members forms passages in the strips at the right of the passages $A^1$ and $B^1$. The passages formed by the dies on their second operation are designated $A^2$, $B^2$, and $C^2$, and it will be seen from Fig. 21 that the next feeding movement of the strips aligns portions of the strips at the right of passages $A^2$ and $B^2$ with the die members B and C so that such members then operate to form other passages in the strips at the right of passages $A^2$ and $B^2$ (see Fig. 22).

Throughout Figs. 19 to 24 of the drawings, the passages formed in the strips are designated $A^1$, $B^1$, $C^1$; $A^2$, $B^2$, $C^2$; $A^3$, $B^3$, $C^3$; $A^4$, $B^4$, $C^4$; and $A^5$, $B^5$, and $C^5$, according as such passages are formed by the first, second, third, fourth, or fifth operations of the die members.

The passages or recesses formed in the strips by the dies have their wide portions at their rear ends from which it results that the nails are so wound on the take-up reels 230 that they will unwind therefrom points first. The reels 230 may therefore be removed from the machine of this invention and mounted directly on a fastening inserting machine of suitable type without necessity of rewinding the nail strings on to the reels of the fastening inserting machine such as arises when the nail strings are wound points first on the reel or reels of the nail string making machine.

Having thus described my invention, what I claim as new and desire to secure by Letters Patent of the United States is:

1. The method of making nail strings from strips of metal each of which is oblong in cross section, which consists in positioning a plurality of the strips side by side with their contiguous edges, which correspond to the thickness dimension of each strip, in substantial contact and then dieing out from the strips spaced portions oppositely disposed relatively to the line of contact of the strips to form the latter into nail strings.

2. The method of making nail strings which consists in positioning a plurality of metal strips side by side with their contiguous edges in contact and then dieing out spaced portions from the contiguous edges of the strips to form them into nail strings.

3. The method of making nail strings which consists in positioning a plurality of metal strips side by side with their contiguous edges in substantial contact and then dieing out spaced portions from the contiguous edges of the strips tapered from one end to the other and reversely arranged on opposite sides of the line of contact of the strips so as to produce nail strings having the nails thereof extending in the same direction and formed with tapered shanks.

4. A machine of the class described comprising means for guiding a plurality of contacting strips through the machine, and means for simultaneously dieing out portions of each strip extending partially across the strips so as to form them into nail strings.

5. A machine of the class described comprising means for guiding a plurality of strips disposed side by side and in contact and means for dieing out spaced portions from the contiguous edges of the strips to form them into nail strings.

6. In a machine of the class described, means providing a single guiding passage constructed to receive a plurality of strips and means for dieing out spaced portions from the contiguous edges of the strips to form them into nail strings.

7. A machine of the class described comprising means for guiding a plurality of strips disposed side by side and in contact through the machine, and means for dieing out simultaneously portions of the strips on opposite sides of the line of contact of the strips to form said strips into nail strings.

8. A machine of the class described comprising means for guiding a plurality of strips disposed side by side and in contact through the machine and means for dieing out spaced elongated portions from the strips of greater dimensions at one end than at the other so as to form the strips into nail strings composed of nails having tapered shanks.

9. In a machine of the class described, means for guiding a plurality of strips disposed side by side and in contact through the machine, a die over which the strips are guided having an opening formed therein extending to each side of the line of contact of the strips by a distance less than the width of the corresponding strip and having its median line arranged to register substantially with the line of contact of the strips, a movable die corresponding in form to the opening in the first-mentioned die, and means for operating said movable die to cut out spaced portions from the contiguous edges of the strips to form the strips into nail strings simultaneously.

10. In a machine of the class described, means for guiding a plurality of strips disposed side by side and in contact through the machine, a die over which the strips are guided having an opening formed therein extending to each side of the line of contact of the strips, a movable die corresponding in form to the opening in the first-mentioned die, and means for operating said movable die to cut out spaced portions from the contiguous edges of the strips to form the strips into nail strings simultaneously.

11. In a machine of the class described, guiding means providing a single guiding passage constructed to receive a plurality of strips, a die over which the strips are guided having an opening formed therein with its median line substantially in register with the median line of the guiding passage, a movable die corresponding in form to the openings in the first-mentioned die, and means for operating said movable die to sever spaced portions from the contiguous edges of the strips to form the strips into nail-strings simultaneously.

12. In a machine of the class described, means for guiding a plurality of strips disposed side by side and in contact through the machine, a stationary die over which the strips are guided having openings whose median lines are arranged to register with the line of contact of the strips and being formed at each side of their median lines similarly, movable die members of a form corresponding to the openings in the stationary die, and means for operating the movable die members to sever spaced portions from the contiguous edges of the strips to form the strips simultaneously into a plurality of nail-strings of like form.

13. A machine of the class described comprising means for guiding a plurality of strips side by side and in contact through the machine, means for operating on the strips, means for feeding the strips, and means for separately delivering the strips to distinct delivery locations.

14. A machine of the class described comprising means for guiding a plurality of strips side by side in their passage through the machine, means for dieing out opposite portions of the strips from contiguous edges of the strips so as to form them into nail strings, and means for delivering the nail strings from the machine constructed to urge them against the outer walls of the guiding passage.

15. A machine of the class described comprising means constructed to present a passage flared at its delivery end for guiding a plurality of strips side by side through the machine, means for dieing out opposite portions of the strips from contiguous edges of the strips so as to form them into nail-strings, and means for delivering the nail strings from the machine constructed to urge the nail strings toward the outer walls of the guiding passage, said means comprising reels for the nail-strings spaced apart by a distance greater than that between the walls of the guiding passage.

16. A machine of the class described comprising means for guiding a strip in its passage through the machine, means for dieing out spaced elongated portions from the edge of the strip to form the strip into a nail string having the shanks of the nails defined by the recesses created by the dieing out of said portions, a wheel having projections for engaging with a working clearance in the recesses of the strip, and means for operating the wheel to withdraw the strip from the machine.

17. A machine of the class described comprising means for guiding a plurality of strips side by side in their passage through the machine, means for dieing out opposite portions of the strips from contiguous edges of the strips so as to form them into nail strings, and a wheel having projections arranged to engage the heads of the nails in the nail strings to withdraw them from the machine.

18. In a machine for operating upon a strip, feeding means for advancing the strip into the machine, means for withdrawing the strip from the machine, means for operating said withdrawing means at a greater rate of speed than said feeding means to maintain the strip under tension during operation thereon by the machine, connections between said withdrawing means and said operating means constructed to yield to avoid breakage of the strip between the feeding means and the withdrawing means, a reel upon which the strip is wound, and means for rotating the reel.

19. In a machine for operating upon a strip, means for advancing the strip into the machine, means for dieing out portions of the strip to form it into a nail string, a reel, means for withdrawing the strip from the machine and moving it toward the reel, and means for operating the withdrawing means at a more rapid rate of speed than the feeding means so as to tension the strip between the advancing means and the withdrawing means.

20. In a machine for operating upon a strip, means for advancing the strip, means for dieing out portions of the strip to form the strip into a nail string, means for withdrawing the strip from the machine comprising a member having projections disposed to engage the heads of the nails of the nail string, means for operating said member normally at a more rapid rate of speed than the advancing means, and connections between said operating means and said member constructed to yield to insure against breakage of the strip.

21. In a machine of the class described, means for guiding a strip, mechanism for operating on the strip to form it into a nail string, swaging means operable on an edge of the strip prior to the operation of said mechanism to prepare the strip for operation thereon by said mechanism, and means for operating the swaging means.

22. In a machine of the class described, guiding means formed to provide guiding passages of different widths arranged with the delivery end of the wider passage in juxtaposition with the inlet end of the narrower passage, a swaging device positioned adjacent to the delivery end of the wider passage and operable against the edge of a strip in said passage, and means for operating the swaging device.

23. A machine of the class described comprising means for guiding a plurality of strips disposed side by side and in contact through the machine, means for swaging an edge of one of the strips, and means for dieing out spaced portions from the contiguous edges of the strips to form them into nail strings.

24. In a machine of the class described, means for guiding a strip, means for feeding the strip, means for operating the feeding means intermittently, mechanism for operating on the strip to form it into a nail string, swaging means operable on an edge of the strip between the feeding means and said mechanism, and means for operating the swaging means in the intervals between the operations of the feeding means.

25. In a machine of the class described, means for guiding a strip, means for feeding the strip, a swaging device formed to present a surface for engagement with an edge of the strip and having an extension below said surface arranged to underlie and support the strip, and means for operating said device constructed to permit the device to move away from the strip under the control of the strip and to move the device at a predetermined time in the cycle of operations of the machine in a direction transverse to the direction of movement of the strip against the edge of the strip.

26. In a machine of the class described, a plurality of shafts, means for operating the shafts continuously, strip feeding rolls carried by the shafts constructed to feed the strip intermittently, and means for separating the rolls to facilitate the introduction of strips between them.

27. In a machine of the class described, a plurality of shafts, means for operating the shafts, strip feeding rolls carried by the shafts constructed and arranged to enable the extent of the feeding movement of the strip to be varied by relative roll and shaft adjustment, and an eccentric sleeved about one of said shafts for separating the shafts to facilitate the introduction of strips between them.

28. In a machine of the class described, strip feeding rolls having their peripheral surfaces formed with raised and depressed portions and disposed to grip a strip only when a raised portion of each roll lies in the line joining the axes of the rolls, means for rotating said rolls to feed the strip when gripped by the rolls, an eccentric for moving the rolls toward and from each other, yielding means tending normally to move the eccentric in a direction to cause the rolls to approach each other, and means for retaining the rolls in separated position in opposition to the action of the yielding means.

29. In a machine of the class described, a feed roll for operating on a plurality of strips disposed side by side, a shaft upon which said roll is mounted, and means for mounting said roll loosely on the shaft constructed and arranged to permit movement of the roll by the strips so as to locate its axis at varying angles to the shaft whereby the roll is adapted to operate on a plurality of strips of different thicknesses.

30. In a machine of the class described, a shaft having a rounded portion, a feed roll mounted on said rounded portion, means for securing the feed roll normally at right angles to the shaft comprising a compressible member yieldable to permit movement of the feed roll on said rounded portion.

31. In a machine of the class described, a feed roll, a shaft, and means for mounting the feed roll for tipping movement in the direction of extension of the shaft.

32. In a machine of the class described, a stationary die, a movable die operable against the stationary die to sever portions from a strip, a stripper plate constructed and arranged normally to engage and control a strip on the stationary die but to permit movement of the strip, means for guiding the strip into operative relation with the dies and between the plate and the stationary die, a plurality of fingers overlying the stripper plate, and means for forcing the fingers against the plate to cause it to clamp the strip on the stationary die.

33. In a machine of the class described, a stationary die, a stripper plate mounted above the die, means co-acting with one of the edges of the plate for securing it in place, a movable die operable against the stationary die to sever portions from the strip, means for guiding a strip into operative relation with the dies and between the plate and the stationary die, a plurality of fingers overlying the free edge of the stripper plate, and means operated at a predetermined time in the cycle of operations of the machine for forcing the fingers down upon the plate to clamp the strip between the plate and the die.

34. In a machine of the class described, means for guiding strip material through the machine, means for feeding the strip material, a stationary die having an opening over which the strip material is guided in its movement through the machine, a movable die corresponding in form to said opening, means for reciprocating the movable die into and out of said opening to sever from the strip material symmetrical portions upon each side of the median line of the material to form the material into a plurality of nail strings, means for clamping the strip material upon the stationary die during the operation of the movable die thereon to maintain the strip material against movement during operation of the dies, and means for operating the feeding means intermittently of the operations of the dies and the clamping means.

35. In a machine of the class described, means for dieing out portions of a strip, automatic means for feeding the strip intermittently past said dieing means in such a manner as to cause said dieing means to remove aligned portions of the strip thus forming a row of passages along the strip, and means operable into one of the passages of the row to locate the strip relatively to the dieing means for operation of the dieing means to form another passage in the same row.

36. In a machine of the class described, means for dieing out portions of a strip, automatic means for feeding the strip intermittently past said dieing means in such a manner as to cause said dieing means to remove aligned portions of the strip thus forming a row of passages along the strip, means operable into one of the passages of the row to locate the strip relatively to the dieing means for operation of the dieing means to form another passage in the same row, and means for controlling the locating means constructed and arranged to cause said means to enter the passage of the strip substantially simultaneously with the suspension of the operation of the feeding means.

37. In a machine of the class described, means for automatically feeding a strip, means for dieing out portions of the strip to form a row of passages along the strip, a finger, means for inserting the finger in a passage of the row for locating the strip relatively to the dieing means in position for the removal therefrom of a portion of the strip in alignment with the row of passages, means for operating the dieing means to remove such portion of the strip therefrom, and means for moving the finger out of the passage of the strip to permit feeding of the strip.

38. In a machine of the class described, means for automatically feeding a strip, means for engaging an opening in the strip to determine the limit of advance of the strip, and means connected with the feeding means for controlling the operation of the engaging means.

39. In a machine of the class described, means for automatically advancing a strip into the machine, means operated at a more rapid rate of speed than the feeding means for withdrawing the strip from the machine, a finger for engaging an opening in the strip to determine the point of advance of the strip, and means connected with the withdrawing means for controlling the operation of the finger.

40. In a machine of the class described, means for advancing a strip into the machine, means for dieing out portions of the strip so as to form passages therethrough, means for withdrawing the strip from the machine comprising a wheel formed with projections adapted to engage in the passages of the strip, means for operating said wheel, means for engaging a part of the strip to determine the extent of advance of the strip, and means associated with the operating means for said wheel for controlling the operation of said engaging means.

41. In a machine of the class described, means for advancing a strip into the machine, means for dieing out portions of the strip so as to form passages therethrough, means for withdrawing the strip from the machine comprising a wheel formed with projections adapted to engage the passages of the strip, means for operating said wheel, means for engaging a passage of the strip to determine the extent of advance of the strip, an arm operatively connected to said engaging means, and means associated with the wheel for controlling the movements of said arm thereby to control the operation of said engaging means.

42. In a machine of the class described, intermittently operated means for dieing out a plurality of portions of a strip at one time to form a corresponding number of nails in the strip, means for feeding the strip in the intervals between the operations of the dieing means through a distance equal to the aggregate lengths of the nails formed at one time by the dieing means, means for engaging a passage of the strip formed by severing a portion from the strip to control the feeding of the strip past the dieing means, and operating means for said engaging means comprising means for removing said engaging means from a passage of the strip, means for normally urging said engaging means in a direction to engage a passage of the strip, and means for rendering said urging means inoperative until the strip has substantially completed its feeding movement so that the engaging means is withheld from engagement with the strip during the feeding of the strip.

43. In a machine of the class described, means for advancing a strip into the machine, means for withdrawing the strip from the machine, means for checking the movement of the strip, normally inoperative means tending when operative to move the withdrawing means in a direction to withdraw the strips from the machine, and means for rendering said last-named means operative upon suspension of the movement of the strip to prevent backward movement of the withdrawing means by the tension of the strip.

44. In a machine of the class described, means for advancing a strip into the machine, a feed wheel for withdrawing the strip from the machine, means for checking the movement of the strip, a disk operatively connected with the feed wheel and provided with recesses having inclined surfaces, a member having an inclined surface adapted to co-act with the inclined surfaces of said recesses, the arrangement of said inclined surfaces being such that pressure exerted by the inclined surface of said member on the inclined surface of one of said recesses tends to move the feed wheel in the direction to withdraw the strip, and means for moving said member in a direction to exert such pressure substantially simultaneously with the checking of the movement of the strip.

45. In a machine of the class described, means for advancing a strip into the machine, a feed wheel for withdrawing the strip from the machine, means for checking the movement of the strip, a disk operatively connected with the feed wheel and provided with recesses having inclined surfaces, a member having an inclined surface adapted to co-act with the inclined surfaces of said recesses, the arrangement of said inclined surfaces being such that pressure exerted by the inclined surface of said member on the inclined surface of one of said recesses tends to move the feed wheel in the direction to withdraw the strip, means for moving said member in a direction to exert such pressure substantially simultaneously with the checking of the movement of the strip, means for locking the disk in stationary position, and means for breaking the operative connection between the feed wheel and disk to permit adjustment of the feed wheel relatively to the disk.

46. In a machine of the class described, means for feeding a strip, means for engaging passages in the strip to control the movement of the strip, and common controlling means for the feeding means and said engaging means.

47. In a machine of the class described, means for automatically feeding a strip, a finger constructed to engage a passage in the strip to control the movement of the strip, and common controlling means for the feeding means and finger.

48. In a machine of the class described, means for guiding a plurality of strips arranged side by side and having opposed recesses formed in their contiguous edges and a feeding device formed with projections adapted to engage the recesses of the strips to feed the strips.

49. In a machine of the class described, means for guiding a nail strip, a stationary die over which the strip is guided, movable die members co-operating with the stationary die to form the strip into a nail string, a head upon which the movable die members are mounted, and means operated by said head for imprinting characters on the side of the nail string.

50. In a machine of the class described, means for guiding a pair of strips arranged side by side through the machine with their edges in substantial contact, means for dieing out adjacent portions of the strips so as to form the strips into nail strings with the heads of the nails extending oppositely from the nail strings, a plate along which the strips are guided formed on one side thereof with characters disposed to register with one of said strips and on the other side with characters disposed to register with the other of said strips, and means for effecting pressure of the plate and strip so that the characters on the plate form imprints on the strip.

51. In a machine of the class described, means for guiding a pair of strips arranged side by side through the machine with their edges in substantial contact, means for dieing out adjacent portions of the strips so as to form them into nail strings with the heads of the nails extending oppositely from the nail strings, a plate over which the strips are guided formed on one side thereof with characters disposed to underlie one of said strips and on the other side with characters disposed to underlie the other of said strips, means for effecting pressure of the plate on the strip so as to cause said characters to form imprints on said plate, said characters being oppositely arranged in the direction of movement of the strips so that the arrangement of the imprints made by the characters on the strips will be similar.

52. In a machine designed to deliver a plurality of strips, reels upon which the strips are coiled, guides for laying strips on the reels, separate actuating members for the reels, a cam operatively connected to the actuating member for each reel for traversing the corresponding guide from side to side of the reel and means providing an independent friction drive to each of the actuating members.

53. In a machine designed to deliver a plurality of strips, a reel upon which each strip is coiled, a guide for laying a strip on each reel, operating devices for each reel and its guide connected together for common movement, and means providing an independent friction drive to each of the operating devices.

54. In a machine of the class described, a wire reel comprising a member having a peripheral surface upon which wire may be coiled, a flange projecting outwardly from one edge of said surface, devices projecting from the opposite side of said member having collars spaced from said member, a disk having openings constructed to pass over said devices and having its edge extending beyond the peripheral surface of said member, and hooked members carried by the disk and arranged for engagement between said collar and said disk to secure the disk to said member.

55. In a machine of the class described, a gang of uniformly spaced tools arranged to operate on sheet material, the distance between corresponding parts of adjacent tools being equal to the length of material upon which one more operation than the number of tools is performed.

56. In a machine of the class described, a gang of punches for dieing out uniformly spaced portions of a strip, the distance between corresponding parts of adjacent punches being equal to the length of strip from which one more portion than the number of punches is died out.

57. In a machine of the class described, a gang of uniformly spaced tools arranged to operate on sheet material, the distance between corresponding parts of adjacent tools being equal to the length of material upon which one more operation than the number of tools is performed, and means for feeding the material step by step between operations each step being of a length equal to the number of tools times the length of material upon which each operation is performed.

58. In a machine of the class described, a gang of punches for dieing out uniformly spaced portions of a strip, the distance between corresponding parts of adjacent punches being equal to the length of strip from which one more portion than the number of punches is died out, and means for feeding the strip step by step between punching operations each step being of a length equal to the length of material between corresponding portions of adjacent punch holes times the number of punches.

In testimony whereof I have signed my name to this specification.

ALBERT LATHAM.